United States Patent [19]

van Steijn

[11] Patent Number: 4,838,489
[45] Date of Patent: Jun. 13, 1989

[54] COUPLING DEVICE

[75] Inventor: Aloijsius C. M. van Steijn, Sassanheim, Netherlands

[73] Assignee: Multinorm B.V., Netherlands

[21] Appl. No.: 216,295

[22] Filed: Jul. 8, 1988

[30] Foreign Application Priority Data

Aug. 18, 1987 [NL] Netherlands .................. 8701944

[51] Int. Cl.⁴ ............................................. B05B 7/26
[52] U.S. Cl. ................................... 239/310; 239/113; 285/226
[58] Field of Search ............... 239/1, 10, 148, 146, 239/172, 106, 310, 112, 113; 285/226; 138/119, 121; 141/97

[56] References Cited

U.S. PATENT DOCUMENTS

| 3,050,087 | 8/1962 | Caplan | 138/121 |
| 3,734,988 | 6/1973 | Kisor et al. | 239/288 X |
| 3,770,198 | 11/1973 | Mihara | 239/10 |
| 3,837,685 | 9/1974 | Miller | 285/226 |
| 3,976,087 | 8/1976 | Bolton et al. | 239/148 X |
| 4,244,522 | 1/1981 | Hartwig | 239/148 |
| 4,631,715 | 12/1986 | Hoover | 138/121 X |

Primary Examiner—Andres Kashnikow
Assistant Examiner—Kevin P. Weldon
Attorney, Agent, or Firm—John P. Snyder

[57] ABSTRACT

The coupling device 1 serves to connect a reservoir 3 to a machine, for instance for use in agriculture in the spraying of herbicides. In order to prevent personnel coming into contact with the concentrated herbicidal substance during changing of the reservoir the line 8, which draws the substance out of the reservoir 3, can be retracted inside the coupling element 4 and the flexible casing 13 connecting thereto. Prior to changing of reservoir 3 the line 8 is entirely retracted into the coupling piece 4 and casing 13, thereby sealing with a suction inlet 9 against the inner bore of coupling piece 4. Dripping liquid therefore remains contained by the coupling piece 4 and the casing 13.

10 Claims, 2 Drawing Sheets

COUPLING DEVICE

The invention relates to a coupling device as described in the heading of claim 1, an agricultural machine as specified in the heading to claim 6 and method as described in the heading to claim 8.

During work with dangerous substances, for instance the spraying of a herbicide solution over a field using a farm machine, due precautionary measures must be taken in order to protect the operatives involved. Skin contact and the like with the dangerous substance must be avoided at all times. The dangerous substance must also not be inhaled. There exist safety regulations to this effect, such as working with gloves and a mask.

There is however a problem when a reservoir of dangerous substance brought onto the market by the chemical industry is to be connected onto the machine. The dangerous substance is marketed in very concentrated form and mixed at the location of use with liquid, usually water, to the required solution. The reservoirs and the size of the filling opening or discharge opening are not standardized. The connecting of the feed line of the machine onto the reservoir therefore results in problems of adaption. Additionally, in order to empty the reservoir entirely, the discharge line to the machine has to reach to the bottom of the reservoir. When the line is removed from the reservoir after use it is therefore coated with the dangerous substance, causing danger to the operative personnel.

The invention has for its object to provide a universally connectable coupling device which obviates the above stated drawbacks. This is achieved according to the invention by the steps as specified in the characterizing part of claim 1.

With such a coupling device a sealing closure can be obtained on a filling opening of any size using the conically tapering coupling element. After use the line connecting onto the machine is wholly withdrawn into the coupling element, thereby sealing the bore in the coupling element with the suction nozzle of the line. The part of the line on which dangerous substance is still present is therefore no longer accessible to the operative.

The coupling element is preferably built up of the parts as described in claim 2. The rigid part can be the conically tapering portion here, while the connecting flexible part simplifies the connection between the reservoir and the position of the connecting point of the machine. The line that is displaceable in the coupling element may be a flexible hose for the purpose of ensuring maximum flexibility.

In preference the suction nozzle is of the type as specified in claim 4. When not in use the suction nozzle is located in the coupling element and sealed against the inner wall of the bore of the coupling element.

In order to optimize the sealing relative to the filling opening of the reservoir the rigid part of the coupling element is preferably provided with a flexible casing.

The current coupling device according to the invention is preferably usable on an agricultural machine as described in the Netherlands patent application No. 85.01365. The steps as in claim 7 are thereby preferably applied. This provides the advantage that the pump which raises up the active substance is not required to pump counter to the pressure of the pump which supplies the solvent.

When the liquid is sprayed over the field, the procedure as in claim 8 is preferably employed. By causing the suction pump for the active substance to reverse direction after spraying, the residue of this active substance still found in the line is pumped back so that no substance is lost or used in any undesired manner.

The invention will be further elucidated with reference to the drawings.

Figure 1:
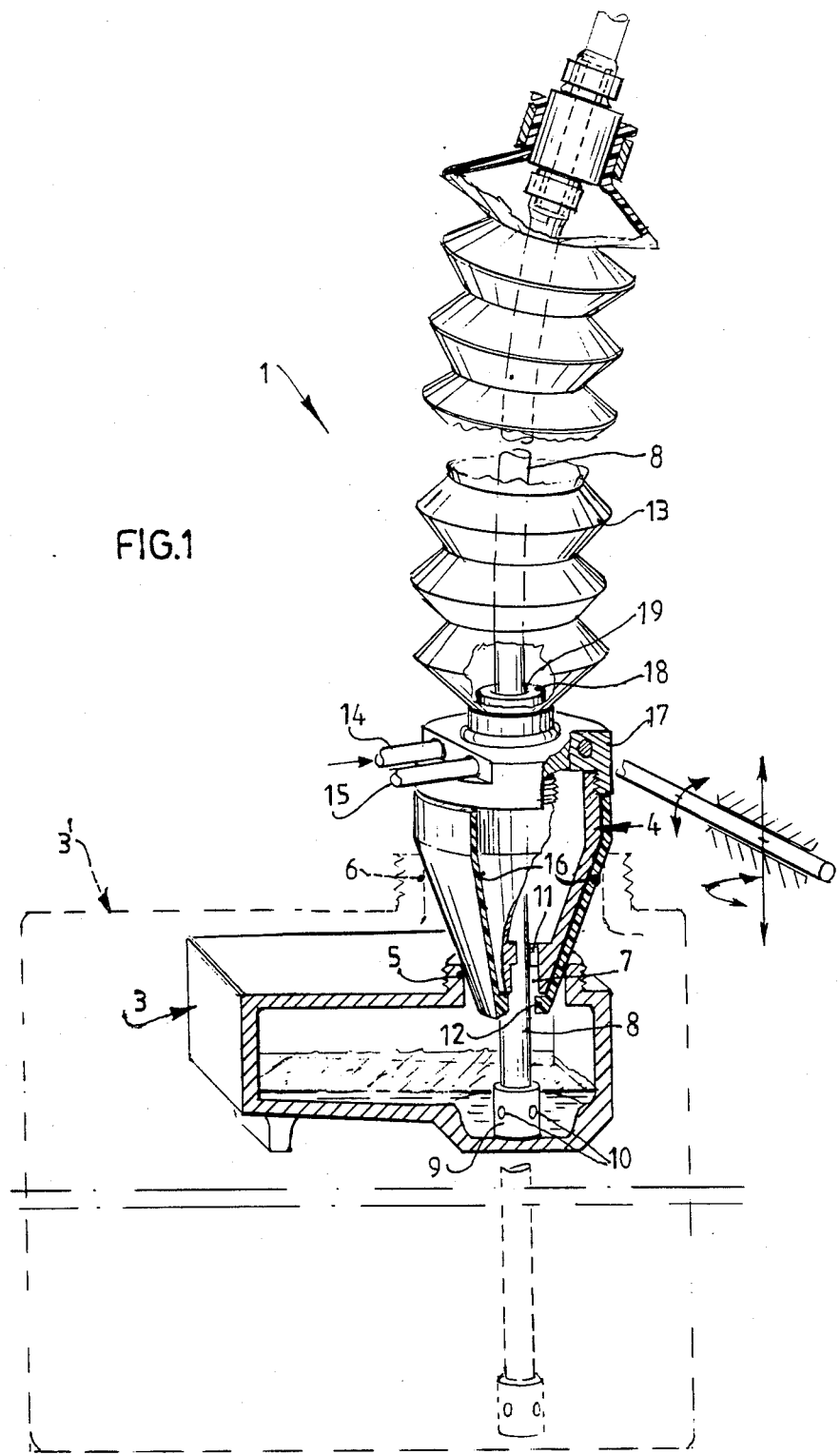
FIG. 1 shows a sectional view of the coupling according to the invention.

The coupling device 1 is intended for the connection of a machine 2 to a reservoir 3 containing dangerous substance. The coupling device contains a conically tapering coupling element 4 which, as a result of the tapering form, can connect onto filling openings 5 and 6 of different size. Shown in FIG. 1 with broken lines is a reservoir of larger dimensions than the reservoir 3. The coupling element 4 displays a bore 7 wherein a line 8 is axially movable and can connect onto the machine. On the end facing toward reservoir 3 the line 8 has a suction inlet 9 with radially directed suction openings 10. In the raised position of line 8 the suction nozzle closes for sealing against the edge 12 of coupling element 4. The movement of line 8 is bounded in axial direction by the step edge 11. In addition to the rigid part 4 the coupling element has a flexible portion 13. Air is fed to the conical part 4 via the conduit 14, this air being able in the position of use to flow through to reservoir 3. Further connected to the coupling element is another line 15 which can be used in the position where the line 8 is drawn up to cause a washing agent to circulate through the conical element 4 in order to wash clean the line, the nozzle and the conical element 4. The line 8 is axially movable in the coupling element under friction that is comparatively great and optionally adjustable with a clamping device, so as to ensure that the line 8 will remain fixed in axial direction in the assumed position. Axial displacement is only possible when a relatively great external, axially directed force is exerted on line 8. Conical element 4 is provided with a flexible casing 16 in order to further improve the sealing relative to the filling opening 5 or 6. Screwed onto coupling element 4 is a flange-shaped part 17 which bears a journal-like part 18. The journal-like part 18 has a passage 19 through which line 8 runs under friction that is relatively great.

The agricultural machine 2 (see FIG. 2) displays a platform 20 for carrying a reservoir 3 for active substance. Using the coupling element 1 according to the invention the reservoir 3 is connected to the agricultural machine. The coupling device can thereby be adjusted in position to the height of the reservoir by means of the standpipe 21 and the clamp 22 vertically movable thereon which bears the coupling device. Ensured as a result is that the conical part 4 of the coupling device connects for clamping and therefore sealing on the filling opening 5 of reservoir 3.

Figure 2:
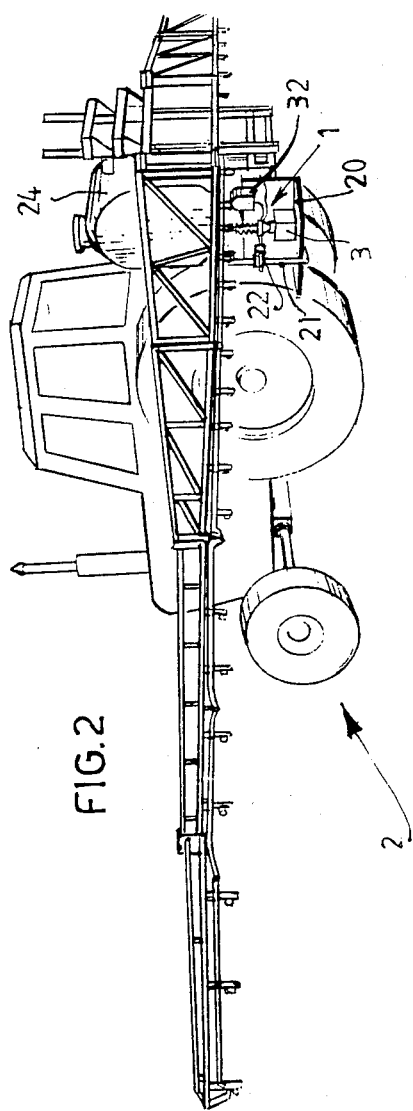
FIG. 2 is a view of an agricultural machine provided with the coupling device according to the invention.
Figure 3:
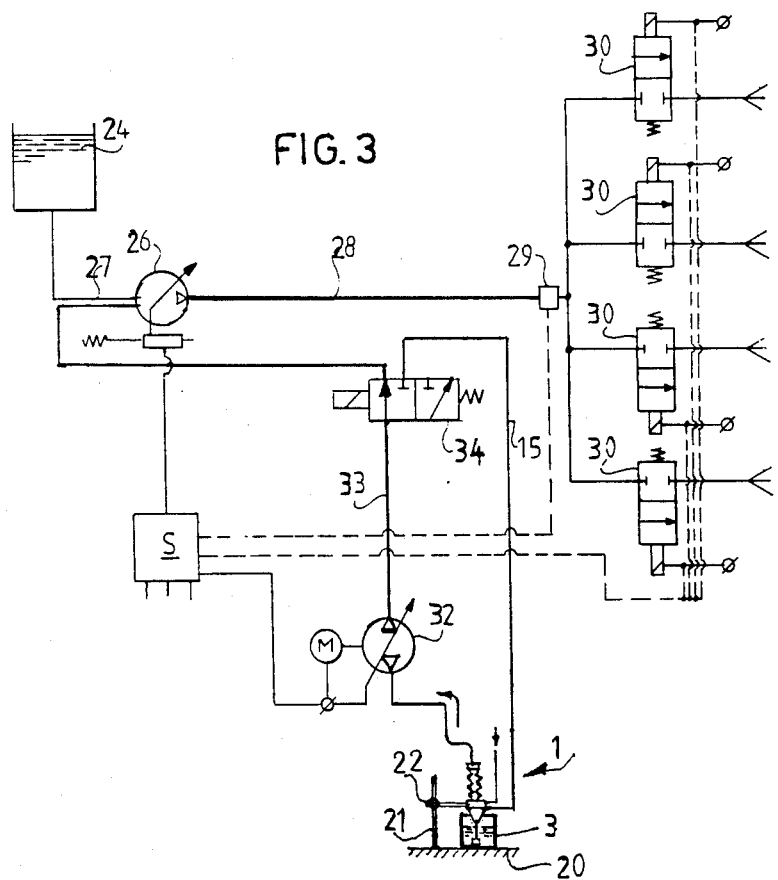
FIG. 3 shows schematically the pump control system for mixing the solvent and the active substance.

FIG. 3 shows the spraying system of the farm machine from FIG. 2. Indicated with the numeral 24 is the supply tank which serves for the storage of a determined quantity of liquid, for example water, which is needed for spraying of the active substance, for example herbicide, stored in reservoir 3.

A controllable pump 26 is connected via a feeder line 27 to the supply tank 24. The output side of the controllable pump 26 is connected via the lead 28 and a pressure transducer 29 to a number of valves 30 in each spraying section. The reservoir 3 is connected via the dosing pump 32, driven by the motor M, and via the lead 33 to the electrically energizable valve 34 the output of which is connected to the suction side of pump 26.

The spray system is controlled by the control circuit S. The operation of the spray system is not a subject of the current invention and will not therefore be described in detail.

The device accorddding to the invention operates as follows.

After placing of reservoir 3 on the platform 20, reservoir 3 is connected to the machine by moving the conical part 4 of the coupling device downward and, using the clamp 22, placing it for sealing onto the filler opening 5 of reservoir 3. The conduit 8 is then moved downward by taking hold manually of the portion of conduit 8 protruding out of the flexible part 13 and pressing downward with this portion 18 counter to the friction. The line 8 is moved to the bottom of reservoir 3. By setting the pumps into operation the active substance is subsequently drawn out of the reservoir 3. Valve 34 is first placed in a position such that the substance circulates via the lies 33 and 15, in order to stir the substance. The valve 34 is then reversed and substance is injected. After performing of the spraying, valve 34 is once again reversed, in order to circulate in the opposite direction so that substance remaining behind in the lines is returned to the reservoir. The length of the line between valve 34 and pump 26 is selected as short as possible. The operative direction of pump 32 is then reversed and liquid is fed via line 15 to the coupling device. The line is washed clean as a result and the coupling device is ready for use with another active substance. Following this, after stopping the pumps, line 8 is pulled up until spray inlet 8 comes up against the stop edge 11 and thereby seals against the edge 12.

During this operation the outer side of line 8 that has been in contact with the active substance is not accessible to the user.

I claim:

1. Coupling device (1) for connecting a machine (2) onto a reservoir (3), particularly one for substance dangerous to health, characterized by a conically tapering coupling element (4) connectable to the filler opening (5, 6) of said reservoir (3), a line (8) in a bore (7) in said coupling element (4) connectable to said machine (2), which line is axially movable between a position located outside said coupling element (4) and a position wherein said line (8) is located wholly within said coupling element (4) and is sealed relative thereto.

2. Coupling device as claimed in claim 1, characterized in that the coupling element (4) consists of a rigid part and a flexible part (13) connecting thereto.

3. Coupling device as claimed in claim 1, characterized in that the line (8) is provided on the end directed to the reservoir (3) with a suction inlet (9) closing off the bore (7) when the line is completely within said coupling element.

4. Coupling device as claimed in claim 3, characterized in that the suction inlet (9) has a closed end portion with radially directed suction openings (10).

5. IN an agricultural machine for dispensing hazardous liquid in a benign carrier, the machine carrying a supply of the benign carrier, first pump means having a suction line and a pressure line for withdrawing the benign carrier from the supply and dispensing a mixture of the hazardous liquid in the benign carrier, hazardous liquid reservoir means carried by the machine and having a neck of indefinite opening size, second pump means having a suction line and a pressure line connected respectively to the hazardous liquid reservoir means and to the suction line of the first pump means for withdrawing hazardous liquid from the hazardous liquid reservoir means and delivering it to the first pump means for admixture with the benign carrier, coupling means having a conical member vertically adjustably mounted on the machine for fixed adjustment into sealing relation with the neck, the suction line of the second pump means passing axially through the conical member and being frictionally gripped thereby so as to be axially slidable in opposition to a predetermined force exerted by the conical means between a downwardly forced position relative to the conical means reaching to the bottom of the hazardous liquid reservoir means and an upwardly forced position relative to the hazardous liquid reservoir means in which the suction line of the second pump means is withdrawn out of the hazardous liquid reservoir means and into the conical member so that the suction line of the second pump means cannot be exposed to manual contact by an operator.

6. In an agricultural machine for dispensing hazardous liquid in a benign carrier as defined in claim 5 wherein the second pump means is reversible to purge hazardous liquid from the suction line of the second pump means.

7. In an agricultural machine for dispensing hazardous liquid in a benign carrier as defined in claim 5 including a suction inlet at the terminal end of the suction line of the second pump means and having a diameter larger than such suction line, the tip portion of the conical member providing a seating edge to limit the upwardly forced position of the suction line relative to the conical member.

8. In an agricultural machine for dispensing hazardous liquid in a benign carrier as defined in claim 5 including valve means for selectively connecting the pressure line of the second pump means to the suction line of the first pump means and to the interior of the conical member.

9. In an agricultural machine for dispensing hazardous liquid in a benign carrier as defined in claim 8 wherein the second pump means is reversible to purge hazardous liquid from the suction line of the second pump means when the valve means connects the pressure line of the second pump means to the interior of the conical member.

10. In an agricultural machine for dispensing hazardous liquid in a benign carrier as defined in claim 5 including a flexible tubular bellows encasing a length of the suction line of the second pump means extending from the conical member.

* * * * *